(12) United States Patent
Saad et al.

(10) Patent No.: US 9,152,578 B1
(45) Date of Patent: Oct. 6, 2015

(54) SECURING DATA REPLICATION, BACKUP AND MOBILITY IN CLOUD STORAGE

(71) Applicant: EMC Corporation, Hopkinton, MA (US)

(72) Inventors: Yossi Saad, Ganei Tikva (IL); Assaf Natanzon, Tel Aviv (IL); Yedidya Dotan, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 147 days.

(21) Appl. No.: 13/795,061

(22) Filed: Mar. 12, 2013

(51) Int. Cl.
| | |
|---|---|
| G06F 21/00 | (2013.01) |
| H04L 29/06 | (2006.01) |
| G06F 12/14 | (2006.01) |
| G06F 21/55 | (2013.01) |
| G06F 11/20 | (2006.01) |
| G06F 17/30 | (2006.01) |
| G06F 15/173 | (2006.01) |

(52) U.S. Cl.
CPC ............ *G06F 12/1408* (2013.01); *G06F 21/55* (2013.01); *G06F 15/173* (2013.01)

(58) Field of Classification Search
CPC .... G06F 12/1408; G06F 21/55; G06F 15/173
USPC ....................... 713/193, 189; 726/26; 707/610
See application file for complete search history.

(56) References Cited

U.S. PATENT DOCUMENTS

| | | | |
|---|---|---|---|
| 7,539,746 B2 | 5/2009 | Bankier et al. | |
| 7,739,733 B2 | 6/2010 | Szydlo | |
| 7,752,492 B1 | 7/2010 | Armangau et al. | |
| 7,827,136 B1 | 11/2010 | Wang et al. | |
| 7,958,372 B1 * | 6/2011 | Natanzon ...................... | 713/189 |
| 8,010,543 B1 | 8/2011 | Armangau et al. | |
| 8,095,804 B1 | 1/2012 | Armangau et al. | |
| 8,132,073 B1 | 3/2012 | Bowers et al. | |
| 8,156,195 B2 | 4/2012 | Hagglund et al. | |
| 8,166,314 B1 | 4/2012 | Raizen et al. | |
| 8,205,049 B1 | 6/2012 | Armangau et al. | |
| 8,261,068 B1 | 9/2012 | Raizen et al. | |
| 8,381,062 B1 | 2/2013 | Juels et al. | |
| 8,416,954 B1 | 4/2013 | Raizen et al. | |
| 8,498,417 B1 | 7/2013 | Harwood et al. | |
| 2008/0148072 A1 * | 6/2008 | Ikeuchi et al. ................ | 713/193 |
| 2014/0245026 A1 * | 8/2014 | Bates ............................ | 713/190 |

FOREIGN PATENT DOCUMENTS

WO     WO 201310136 A2 *  7/2013

OTHER PUBLICATIONS

Camacho, H.E.; Brambila, J.A.; Pena, A.; Vargas, J.M.; "A cloud enviroment for backup and data storage"; Electronics, Communications and Computers (CONIELECOMP), 2014 International Conference; Year: Jan. 2014; pp. 111-117.*

* cited by examiner

*Primary Examiner* — Andrew Nalven
*Assistant Examiner* — Courtney Fields
(74) *Attorney, Agent, or Firm* — BainwoodHuang

(57) ABSTRACT

A technique secures data in cloud storage. The technique involves receiving, by processing circuitry, an input/output (I/O) request which includes host data. The technique further involves encrypting, by the processing circuitry, the host data to form encrypted data and sending a block-based write transaction which includes the encrypted data to a replication storage array to store the encrypted data within the replication storage array. The technique further involves storing, by the processing circuitry, the host data within the production storage array. The encrypted host data is stored within the replication storage array to secure the host data which is also stored at the production storage array.

22 Claims, 8 Drawing Sheets

SECURING DATA REPLICATION, BACKUP AND MOBILITY IN CLOUD STORAGE

BACKGROUND

A company may maintain a local data storage system and an off-premises data storage system for fault tolerance, e.g., for failover, for disaster recovery, etc. In such a situation, as host computers of the company write host data to the local data storage system, copies of that host data are saved to the off-premises data storage system. As a result, if access to the host data stored within the local data storage system is somehow lost (e.g., due to a hardware or local network failure, due to a complete failure of the corporate site, etc.), the host data is still accessible from the off-premises data storage system.

Some data storage systems are configured to journal write operations, i.e., to store write operations with timestamps in journal volumes. Such operation enables the data storage systems to roll-back the host data to earlier points in time, i.e., recovery points. In the above-identified conventional replication situation in which host data is stored in a local data storage system as well as an off-premises data storage system, both the local data storage system and the off-premises data storage system may be equipped with this journaling/roll-back feature.

SUMMARY

Unfortunately, there are deficiencies to the above-described conventional replication situation in which host data simply is stored in a local data storage system as well as an off-premises data storage system. For example, a company may be limited in resources and thus be unable to afford and/or maintain an off-premises data storage system in addition to a local data storage system. Such a company could consider hiring a third-party cloud storage service (i.e., remote public-cloud storage) to store a copy of its host data but, ultimately, the company might decide against this alternative due to security issues. In particular, the company may not wish to utilize the third-party cloud storage service due to concerns over data privacy (e.g., the host data could be read by the third-party), access control (e.g., the company would need to rely on third-party for access control), and compliance (e.g., arguably the company might come close to violating certain data protection/transfer laws involving personal information, national security, and so on).

In contrast to the above-described conventional replication situation in which host data simply is stored in a local data storage system as well as an off-premises data storage system, an improved technique is directed to encrypting host data before it leaves to an un-trusted system. Along these lines, a company which employs a third-party cloud storage service may encrypt the host data and send, in the form of block-based write transactions, only encrypted data to the third-party cloud storage service. Accordingly, only encrypted data leaves the company premises. As a result, the host data cannot be read by the third-party cloud storage service. Additionally, the company does not need to rely on the third-party cloud storage service for access control (i.e., the company can decide who holds the cryptographic keys). Furthermore, the company can avoid compliance issues (e.g., personal information is not disclosed, there are no disclosures made which pose national security issues, etc.).

One embodiment is directed to a method of securing data in cloud storage. The method includes receiving, by processing circuitry, an input/output (I/O) request which includes host data. The method further includes encrypting, by the processing circuitry, the host data to form encrypted data and sending a block-based write transaction which includes the encrypted data to a replication storage array to store the encrypted data within the replication storage array. The method further includes storing, by the processing circuitry, the host data within the production storage array. The encrypted data is thus stored within the replication storage array to secure the host data which is also stored at the production storage array.

It should be understood that, unlike file-based storage, the I/O requests including the host data may be block-based instructions such as small computer system interface (SCSI) commands. Such an instruction does not reference a file system hierarchy via file attributes such as a path, a filename, etc. Rather, such an instruction typically includes a device identifier (or ID), an offset value, and a data size to identify particular host data. The offset is generally block aligned (e.g., aligned to a 512 byte block).

It should be understood that a host data key is used by the processing circuitry to encrypt the host data. In some arrangements, copies of host data keys to encrypt/decrypt the host data are stored in memory which is located remotely from the production storage array. That is, the host data keys are stored in at least two separate places, e.g., (i) by a key manager at the production storage array and (ii) by a replica of the key manager at either the replication site or a trusted site. Storage of such copies in the replica of the key manager protects against data loss if the host data keys are inadvertently lost or destroyed at the production storage array.

In some arrangements, each of the storage arrays is constructed and arranged to store metadata (along with the host data itself) in a respective journal log. In certain arrangements, the metadata is encrypted/decrypted using metadata keys which are different than the host data keys. Along these lines, encrypted metadata may be sent with the host data from the production storage array to the replication storage array. The metadata keys are available at the replication storage array to decrypt the metadata, but the host data keys may not be present at the replication storage array (thus preventing decryption of the host data at the replication storage array).

It should be understood that these arrangements enable host data recovery to be performed at a variety of locations. For example, the encrypted data may be sent from the replication storage array back to the production storage array to recover the host data at the production storage array (i.e., since the production storage array already possesses the keys, the production storage array simply decrypts and recovers the encrypted host data received from the replication storage array). Alternatively, the encrypted data and the keys may be sent to a cloud recovery site to recover the host data at the cloud recover site (e.g., disaster recovery).

Moreover, some arrangements involve user authentication. Along these lines, a user (e.g., an administrator) may authenticate with the replication storage array and direct recovery to take place at the replication storage array. In particular, the user may provision the replication storage array with the host data keys and then decrypt the encrypted data using those keys in order to access the host data from the replication storage array.

In some arrangements, the user is able to provide the replication storage array with a lockout command that later deletes the host data keys from the replication storage array thus preventing further access to the host data at the replication storage array (e.g., bring the host data keys to the cloud only during disaster recovery and erase the host data keys from the cloud when not performing disaster recovery). In some arrangements, the user is required to periodically re-authenticate with the replication storage array to maintain host data access and/or to continue the host data recovery process (e.g., delete the host data keys from the cloud if the user does not successfully re-authenticate). In some arrangements, the host data keys are periodically replaced with new host data keys (e.g., by a key manager/server) to rapidly shift keys which are used to further secure the host data (i.e., all of the host data keys are needed to completely recover the host data). It should be understood that a key manager is a host which securely holds keys and allows key access only to authorized entities.

It should be understood that, in the cloud context, the various circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in securing data in cloud storage.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

Improved techniques are directed to securing data replication, backup and mobility in cloud storage. Such techniques involve encrypting host data before it leaves secure premises (e.g., a private SAN, a virtual private cloud, etc.). Along these lines, a company which employs a third-party cloud storage service (e.g., remote public-cloud storage) may encrypt host data and send, in the form of block-based write transactions, only the encrypted data to the third-party cloud storage service. Accordingly, only encrypted data leaves the company premises. As a result, the host data cannot be read by the third-party cloud storage service. Additionally, the company does not need to rely on the third-party cloud storage service for access control (i.e., the company can decide who holds the keys). Furthermore, the company can avoid compliance issues (e.g., personal information is not disclosed, there are no disclosures made which pose national security issues, and so on).

Figure 1:
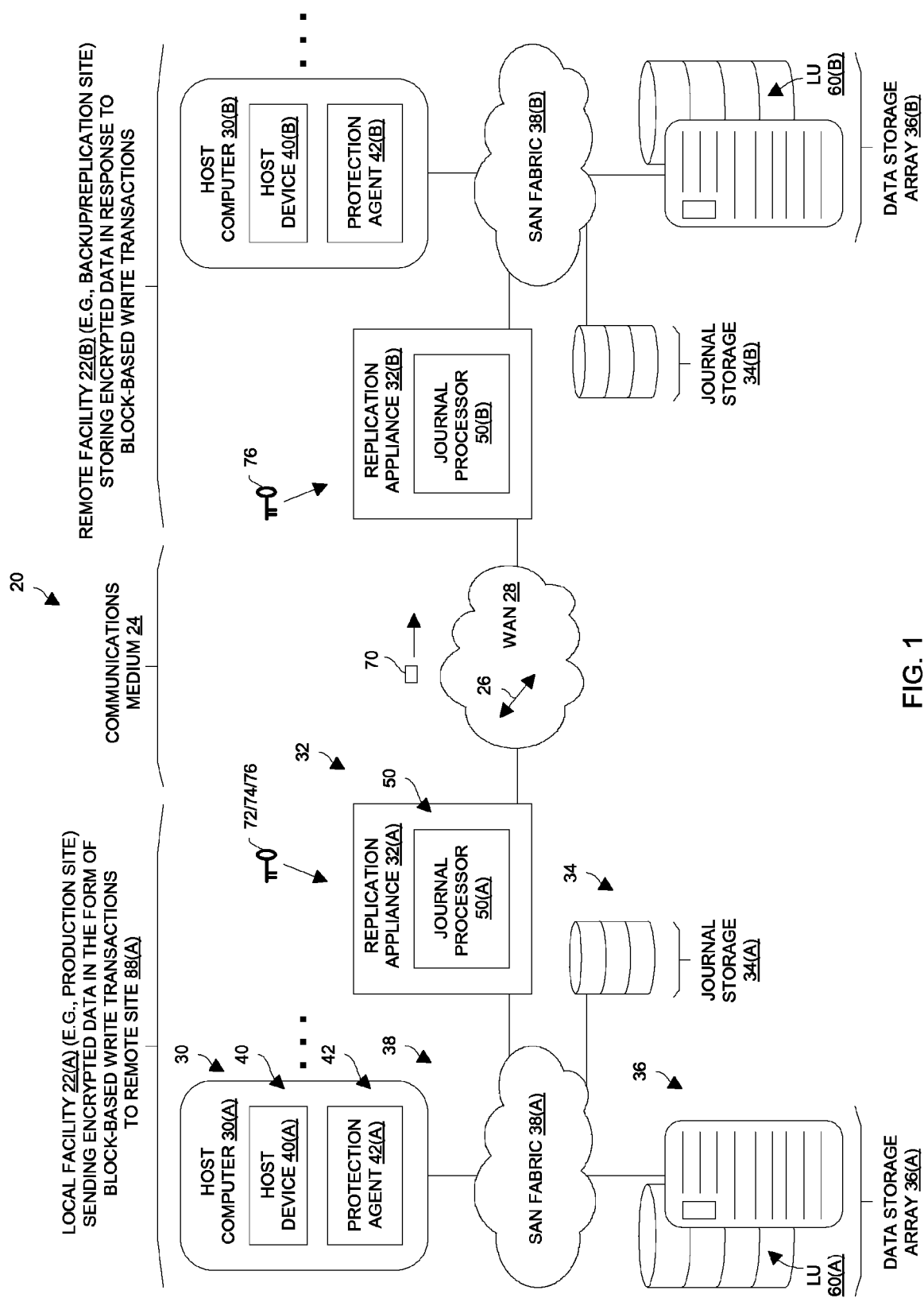
FIG. 1 is a block diagram of an electronic environment which is configured for secure data replication, backup and mobility in cloud storage.

FIG. 1 shows an electronic environment 20 which is suitable for secure host data replication, backup and mobility in cloud storage. The electronic environment 20 includes a local facility 22(A), a remote facility 22(B), and a communications medium 24 disposed between the local and remote facilities 22(A), 22(B) (collectively, data storage facilities 22).

During normal operation, the local facility 22(A) operates as a production site or source side of the electronic environment 20, while the remote facility 22(B) operates as a backup/replica site or destination side of the electronic environment 20. As the backup site, the remote facility 22(B) is responsible for replicating production site host data (i.e., "storage in the cloud" for replication, backup and mobility). Additionally, the remote facility 22(B) enables roll back of the production site host data to an earlier pointing time. Accordingly, the remote facility 22(B) enables the production site host data to be recovered in the event of data corruption or a disaster, or alternatively in order to view or to access host data from an earlier point in time.

It should be understood that the electronic environment 20 is suitable for host data replication of either physical or virtual logical units (LUs). In the context of a virtual environment, a hypervisor is capable of consuming logical units and generating a distributed file system on the logical units. For example, a virtual machine file system (VMFS) is capable of creating files and exposing the files as logical units to virtual machines where each virtual machine disk (VMDK) is seen as a small computer system interface (SCSI) device by virtual hosts. As another example, a hypervisor is capable of consuming a network based file system and exposing files in the network based file system as SCSI devices to virtual hosts.

Normally, the replication direction of host data is from the local facility 22(A) (i.e., the production site or the source side of the electronic environment 20) to the remote facility 22(B) (i.e., the backup/replication site or the destination side of the electronic environment 20). However, a user may reverse the replication direction so that host data flows from the remote facility 22(B) to the local facility 22(A) where the remote facility 22(B) operates as the production site or source side and the local facility 22(A) operates as the backup site or destination side. Such change of replication direction is referred to as a "failover". A failover may be performed in the event of a disaster at the production site, or for other reasons. In some data architectures, either facility 22 behaves as a production site for a portion of stored host data, and behaves simultaneously as a backup site for another portion of stored host data. In some data architectures, a portion of stored host data is replicated to a backup site, and another portion is not.

It should be understood that there is no distance requirement between the local facility 22(A) and the remote facility 22(B). Rather, the facilities 22(A), 22(B) are designated local and remote simply to indicate that they reside within separate zones, e.g., a trusted zone for the local facility 22(A) and another zone (e.g., "the public cloud") for the remote facility 22(B) separated by the communications medium 24. Along these lines, the facilities 22 may be physically remote from one another, or they may both be situated physically at a common site, local to one another. Local data protection has the advantage of minimizing data lag between source and destination, and remote data protection has the advantage is being robust in the event that a disaster occurs at the source side. Since the copy of the host data at the remote facility 22(B) is encrypted, the issue of regulatory restrictions on the location of the host data is essentially removed, i.e., the host data can be stored anywhere since the encrypted copy of the host data is unreadable.

It should be further understood that the communications medium 24 is constructed and arranged to convey electronic signals 26 between the facilities 22 (e.g., see the double arrow 26). At least a portion of the communications medium 24 is illustrated as a cloud to indicate that the communications medium 24 is capable of having a variety of different topologies including backbone, hub-and-spoke, loop, irregular, combinations thereof, and so on. Along these lines, the communications medium 24 may include copper-based data communications devices and cabling, fiber optic devices and cabling, wireless devices, combinations thereof, etc. Furthermore, the communications medium 24 is capable of supporting LAN-based communications, SAN-based communications, combinations thereof, etc. By way of example, the facilities 22 communicate via a wide area network (WAN) 28, although other types of networks may be used.

Each facility 22 includes a host computer (or simply host) 30, a replication appliance 32, journal storage 34, a data storage array 36, and a storage area network (SAN) fabric (or medium) 38. Each host computer 30 includes at least one host device 40 and a protection agent 42 (sometimes referred to as a splitter). Each replication appliance 32 includes a journal processor 50. In some arrangements, the journal storage 34 is integrated with the data storage array 36. Additionally, in some arrangements, the protection agent 42 resides in a location other than the host computer 30, e.g., within the SAN fabric 38, within the replication appliance 32, within the data storage array 36, and so on.

Furthermore, it should be understood that one or more of the components of the facility 22 may be implemented in the form of code running in a virtual environment. For example, the protection agent 42 may be implemented at a hypervisor level. Also, the replication appliance 32 may be implemented as a module of the data storage array 36 or as a virtual machine running on actual hardware (i.e., code executing on processing circuitry).

In particular, the local facility 22(A) includes a host computer 30(A), a replication appliance 32(A), journal storage 34(A), a data storage array 36(A), and SAN fabric 38(A). The host computer 30(A) includes a host device 40(A) and a protection agent 42(A). Additionally, the replication appliance 32(A) includes a journal processor 50(A).

Likewise, the remote facility 22(B) includes a host computer 30(B), a replication appliance 32(B), journal storage 34(B), and a data storage array 36(B), and SAN fabric 38(B). The host computer 30(B) includes a host device 40(B) and a protection agent 42(B). Additionally, the replication appliance 32(B) includes a journal processor 50(B).

It should be understood that generally each SAN fabric 38 connects block-based devices which are referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches.

The communications links of the SAN fabric 38 between each host computer 30 and its corresponding data storage array 36 may be any appropriate medium suitable for data transfer, such as fiber communication channel links, or IP communications (iSCSI). Furthermore, each host computer 30 communicates with its corresponding data storage array 36 using block-based I/O requests such as SCSI commands. Such I/O requests typically comply with a specific set of block-based protocols which involves, among other things, a device ID, an offset value, and a data size to identify particular host data.

Each data storage array 36 includes physical storage units for storing data, such as flash memory drives and/or magnetic disks. This storage is presented by the array 36 as one or more logical units (LUs). That is, the array 36 exposes one or more LUs to which I/O requests are issued (e.g., SCSI commands in accordance with the well-know I-T-L or initiator-target-LU nexus). Thus, the arrays 36 are SAN entities that provide multiple logical units for access by multiple SAN initiators.

Each LU may be a physical logical unit or a virtual logical unit, and may be identified by a unique logical unit number (LUN). As shown in FIG. 1 and by way of example, the data storage array 36(A) exposes a LU 60(A). Similarly, the data storage array 36(B) exposes a LU 60(B). LU 60(B) is used for replicating LU 60(A). As such, LU 60(B) is generated as a copy of LU 60(A). In one embodiment, LU 60(B) is configured so that its size is identical to the size of LU 60(A). Thus, for LU 60(A), the data storage array 36(B) serves as a backup for the data storage array 36(A). Alternatively, some logical units of the data storage array 36(B) may be used to back up logical units of the data storage array 36(A), and other logical units of the data storage array 36(B) may be used for other purposes. Moreover, there may be symmetric replication whereby some logical units of the data storage array 36(A) are used for replicating logical units of the data storage array 36(B), and other logical units of the data storage array 36(B) are used for replicating other logical units of data storage array 36(A).

Each data storage array 36 is shown as having at least one host 30. It should be understood that the host 30 may be one computer, a plurality (or cluster) of computers, or a network of distributed computers. Each computer may include inter alia a conventional CPU, volatile and non-volatile memory, a data bus, an I/O interface, a display interface, a network interface, etc. Generally a host 30 runs at least one data processing application, such as a database application, an e-mail server, and so on.

Generally, an operating system of a host 30 creates a corresponding host device 40 for each logical unit exposed by the data storage array 36 in the host computer SAN. That is, each host device 40 is a logical entity in a host 30 through which access is made to a logical unit. Along these lines, the host 30(A) identifies LU 60(A) and generates a corresponding host device 40(A) through which it can access LU 60(A). Similarly, the host 30(B) identifies LU 60(B) and generates a corresponding host device 40(B) through which it can access LU 60(B).

In the course of continuous operation, the host 30(A) is a SAN initiator that issues I/O requests (write/read operations) through the host device 40(A) to the LU 60(A) using, for example, SCSI commands. Such block-based I/O requests are generally transmitted to the LU 60(A) with an address that includes a specific device identifier, an offset within the device, and a data size. Offsets are generally aligned to 512 byte blocks. The average size of a write operation issued by the host computer 30(A) may be, for example, ten (10) kilobytes (KB); i.e., 20 blocks. For an I/O rate of 50 megabytes (MB) per second, this corresponds to approximately 5,000 block-based write transactions per second.

The electronic environment 20 includes two replication appliances 32, i.e., a source side replication appliance 32(A) and a destination side replication appliance 32(B). Each replication appliance 32 performs various data protection services, such as data replication of a source side host data, and journaling of I/O requests issued by a host 30 to the source side host data. As explained in detail herein, the production side replication appliance 32(A) encrypts host data prior to sending the encrypted host data to the destination side replication applicants 32(B). As further explained in detail herein, when acting as a destination side replication appliance 32(B), the replication appliance 32(B) may also enable roll back of host data to an earlier point in time, and processing of rolled back host data at the destination side.

Each replication appliance 32 is a computer that includes inter alia one or more conventional CPUs and internal memory. In some arrangements, each replication appliance 32 is a cluster of such computers for additional safety/precaution. Use of a cluster ensures that if a particular replication appliance computer of the cluster is down, then the replication appliance functionality switches over to another computer of the cluster. The replication appliance computers within a replication appliance cluster communicate with one another using at least one communication link suitable for data transfer via fiber channel or IP based protocols, or other suitable transfer protocol. One replication appliance computer from the replication appliance cluster serves as the replication appliance leader. The replication appliance cluster leader coordinates between the computers in the cluster, and may also perform other tasks that require coordination between the computers, such as load balancing.

In the electronic environment 20, the replication appliance 32(A) and the replication appliance 32(B) may be standalone devices integrated within a SAN. Alternatively, the replication appliances 32(A), 32(B) may be integrated into the data storage arrays 36(A), 36(B), respectively, or integrated into the hosts 30(A), 30(B), respectively. In yet other arrangements, the replication appliances 32(A), 32(B) are virtualized (e.g., run in dedicated virtual machines on respective virtualization platforms). Both replication appliances 32(A), 32(B) may communicate with their respective hosts 30(A), 30(B) through communication lines such as fiber channels using, for example, SCSI commands or another protocol.

The replication appliances 32 are configured to act as initiators in the SAN; i.e., they can issue I/O requests using, for example, SCSI commands, to access logical units on their respective data storage arrays 36. The replication appliances 32 are also configured with the necessary functionality to act as targets; i.e., to reply to I/O requests, such as SCSI commands, issued by other initiators in the SAN, including inter alia their respective hosts 30. Being target nodes, the replication appliances 32 may dynamically expose or remove one or more logical units.

As described hereinabove, each facility 22 may behave simultaneously as a production site and a backup site for different logical units. As such, each replication appliance 32 may behave as a source replication appliance for some logical units, and as a destination replication appliance for other logical units, at the same time.

The hosts 30(A), 30(B) include protection agents 42(A), 42(B), respectively. The protection agents 42(A), 42(B) intercept SCSI commands issued by their respective hosts 30(A), 30(B) via the host devices 40(A), 40(B) to logical units that are accessible to the hosts 30(A), 30(B). A protection agent 42 may act on an intercepted SCSI command issued to a logical unit, in one of the following ways: send the SCSI command to its intended logical unit; redirect the SCSI command to another logical unit; split the SCSI command by sending it first to the respective replication appliance 32 and after that replication appliance 32 returns an acknowledgement, send the SCSI command to its intended logical unit; fail the SCSI command by returning an error return code; and delay the SCSI command by not returning an acknowledgement to the respective host 30.

A protection agent 42 may handle different SCSI commands, differently, according to the type of the command. For example, a SCSI command inquiring about the size of a certain logical unit may be sent directly to that logical unit, while a SCSI write command may be split and sent first to a replication appliance associated with the protection agent 42. A protection agent 42 may also change its behavior for handling SCSI commands, for example as a result of an instruction received from the replication appliance 32.

Specifically, the behavior of a protection agent 42 for a certain host device 40 generally corresponds to the behavior of its associated replication appliance 32 with respect to the logical unit of the host device 40. When a replication appliance 32 behaves as a source side replication appliance for a certain logical unit, then during the normal course of operation, the associated protection agent splits I/O requests issued by a host 30 to the host device 40 corresponding to that logical unit. Similarly, when a replication appliance 32 behaves as a destination side replication appliance 32 for a certain logical unit, then during normal course of operation, the associated protection agent 42 fails I/O requests issued by host 30 to the host device 40 corresponding to that logical unit.

Communication between the protection agents 42 and their respective replication appliances 32 may use any protocol suitable for data transfer within a SAN, such as fiber channel, or SCSI over fiber channel, or iSCSI for IP-based SANs. The communication may be direct, or via a logical unit exposed by the replication appliance 32. The protection agents 42 communicate with their respective replication appliances 32 by sending SCSI commands over fiber channel.

The protection agents 42(A), 42(B) may take the form of drivers located in their respective host computers 30(A), 30(B). Alternatively, each protection agent 42 may also be located in a fiber channel switch, or in any other device situated in a data path between a host 30 and a data storage array 36 or on the data storage array 36 itself. In a virtualized environment, the protection agent 42 may run at the hypervisor layer or in a virtual machine providing a virtualization layer.

As will be described in further detail below, a corporate entity may have full control over security of the local facility 22(A). For example, the local facility 22(A) may physically reside within a building, complex, or campus that is secure against physical intrusion. Furthermore, the local facility 22(A) may be protected against electronic intrusion via appropriate security equipment running various protocols (e.g., firewalls, gateways, etc.). Accordingly, the local facility 22(A) may be viewed as a trusted zone, and the host data transmitted and stored within the local facility 22(A) need not be encrypted (although the host data may be encrypted within the local facility 22(A) as precaution nevertheless).

However, the corporate entity may not have full control over security of the remote facility 22(B). For example, a third-party cloud storage service may operate the remote facility 22(B). In such a situation, the corporate entity which operates the local facility 22(A) may wish to prevent the third-party cloud storage service from being able to read the host data (at least under normal circumstances). Accordingly, before the local facility 22(A) sends a copy of host data to the remote facility 22(B), the local facility 22(A) encrypts the host data to form encrypted host data, and sends the encrypted host data to the remote facility 22(B) without allowing the unencrypted host data to leave the local facility 22(A). As a result, the remote facility 22(B) stores a full encrypted copy of the host data for robust and reliable disaster and/or operational recovery.

Since only the encrypted host data leaves the local facility 22(A), the host data cannot be read by another entity operating the remote facility 22(B) such as a third-party cloud storage service. Additionally, the corporate entity does not need to rely on the third-party cloud storage service for access control since the corporate entity does not need to share the keys used to encrypt the host data with the third-party cloud storage service. Furthermore, the corporate entity can avoid compliance issues since, if the host data contains personal information, no personal information is disclosed. Also, if the host data contains information that poses national security issues, there are no disclosures made of that information, and so on. Particular details of behavior of the electronic environment 20 under normal production mode and under recovery mode will now be provided.

Production Mode Details

In normal production mode, the replication appliance 32(A) acts as a source side replication appliance for the LU 60(A). Thus, the protection agent 42(A) is configured to act as a source side protection agent; i.e., as a splitter for the host device 40(A). Specifically, the protection agent 42(A) replicates SCSI write commands. Along these lines, in response to a SCSI write command, the protection agent 42(A) sends a replicated SCSI write command to the replication appliance 32(A). After receiving an acknowledgement from the replication appliance 32(A), the protection agent 42(A) sends the SCSI write command to the LU 60(A) of the data storage array 36(A). After receiving a second acknowledgement from the data storage array 36(A), the host 30(A) acknowledges completion of the SCSI write command.

It should be understood that, when the replication appliance 32(A) receives the replicated SCSI write command from the protection agent 42(A), the replication appliance 32(A) encrypts the host data within the write request and then packages the encrypted host data and the write request as a block-based write transaction 70. The replication appliance 32(A) then sends the block-based write transaction 70, over the communications medium 24 (see the WAN 28 in FIG. 1), to the replication appliance 32(B) on the destination side for journaling and for incorporation within the data storage array 36(B). To this end, the replication appliance 32(A) is provisioned with a set of cryptographic keys 72 to generate encrypted host data from the originally unencrypted host data. In some arrangements, the set of cryptographic keys 72 includes a host data key 74 to encrypt the host data, as well as a metadata key 76 to encrypt metadata associated with the host data for journaling/recovery purposes. The set of cryptographic keys 72 are kept in volatile memory at the replication appliance 32(A), and are supplied by a key manager, which stores the set of keys 72 securely in non-volatile memory.

It should be understood that a key exchange protocol allows the replication appliance 32(A) to retrieve keys from the key manager. A suitable mechanism for managing access to the set of keys 72 is RSA® Key Manager which is provided by EMC Corporation of Hopkinton, Mass.

The replication appliance 32(A) may send the block-based write transactions 70 to the replication appliance 32(B) using a variety of modes of transmission, including inter alia (i) a synchronous mode, (ii) an asynchronous mode, and (iii) a snapshot mode. In synchronous mode, the replication appliance 32(A) sends each block-based write transaction 70 to the replication appliance 32(B), receives back an acknowledgement from the replication appliance 32(B) and, in turn, sends an acknowledgement back to the protection agent 42(A). The protection agent 42(A) waits until receipt of such acknowledgement before sending the SCSI write command to the LU 60(A).

In asynchronous mode, the replication appliance 32(A) sends an acknowledgement to the protection agent 42(A) upon receipt of each replicated SCSI write command, before receiving an acknowledgement back from the replication appliance 32(B).

In snapshot mode, the replication appliance 32(A) receives several SCSI write commands and combines them into an aggregate "snapshot" of all write activity identified in the several SCSI write commands and sends, as a block-back write transaction 70, the snapshot to the replication appliance 32(B), for journaling and for incorporation in the data storage array 36(B). In snapshot mode, the replication appliance 32(A) also sends an acknowledgement to the protection agent 42(A) upon receipt of each SCSI write command, before receiving an acknowledgement back from the replication appliance 32(B).

For the sake of clarity, the ensuing discussion assumes that the block-based write transactions 70, which include encrypted host data, are transmitted at write-by-write granularity. It should nevertheless be appreciated that this block-based write information is capable of being transmitted in the aggregate as described above, i.e., as aggregate snapshots.

As mentioned earlier, the host data within the block-based write transactions 70 sent from the replication appliance 32(A) to the replication appliance 32(B) is encrypted. That is, the journal processor 50(A) of the replication appliance 32(A) maintains the set of cryptographic keys 72 and encrypts the host data and sends only the encrypted data within the block-based write transactions 70 to the replication appliance 32(B). Accordingly, no unencrypted host data leaves the local facility 22(A).

While in production mode, the replication appliance 32(B) receives block-based write transactions 70 containing the encrypted host data from the replication appliance 32(A), and performs journaling and writing to storage within the remote facility 22(B). In particular, the block-based write transactions 70 are received as SCSI write operations and processed by the replication appliance 32(B) in a routine manner. Along these lines, the replication appliance 32(B) possesses the metadata key 76 to properly decrypt the metadata associated with the host data and then acts as a SCSI initiator, and sends SCSI commands containing the encrypted host data to the LU 60(B). Additionally, the replication appliance 32(B) updates the journal storage 34(B) to enable subsequent restoration of the data storage array 36(B) to states earlier in time. In some arrangements, the replication appliance 32(B) first writes to the journal storage 34(B), and then writes to the LU 60(B).

Recovery Mode Details

During recovery mode, the replication appliance 32(B) undoes the write transactions in the journal storage 34(B) so as to restore the data storage array 36(B) to a state it was at, at an earlier time.

Recall that the LU 60(B) was described above as being used as a backup of the LU 60(A). As such, during normal production mode, while data written to the LU 60(A) by host 30(A) is replicated from the LU 60(A) to the LU 60(B), the host 30(B) should not be sending I/O requests to the LU 60(B). To prevent such I/O requests from reaching the LU 60(B), the protection agent 42(B) acts as a destination side protection agent for the host device 40(B) and fails I/O requests sent from the host 30(B) to the LU 60(B) through the host device 40(B).

The journal storage 34(B) maintains a history of block-based write transactions 70 made to the LU 60(B), referred to as a journal log or simply journal. In some arrangements, the journal storage 34(B) is integrated with the data storage array 36(B), e.g., the journal is striped over several logical units, or may reside within all of or a portion of another logical unit within the data storage array 36(B). As mentioned earlier, the replication appliance 32(B) includes a journal processor 50(B) which manages the journal.

Along these lines, the journal processor 50(B) manages journal entries of the LU 60(B). Specifically, the journal processor 50(B) processes the block-based write transactions 70 using a multi-step procedure. That is, when the replication appliance 32(B) receives a block-based write transaction 70 from the replication appliance 32(A), the journal processor 50(B) (i) writes the block-based write transaction 70 into the journal storage 34(B), (ii) reads undo information for the transaction from the LU 60(B) (i.e., host data to be overwritten), (iii) updates the journal storage 34(B) with the undo information, (iv) applies the block-based write transaction 70 from the journal storage 34(B) to the LU 60(B), and (v) removes the block-based write transaction 70 from the journal storage 34(B).

Recall that, as mentioned above, all of the host data that is stored at the remote facility 22(B) has been previously encrypted at the local facility 22(A). Accordingly, the host data remains protected while at the remote facility 22(B).

Figure 2:
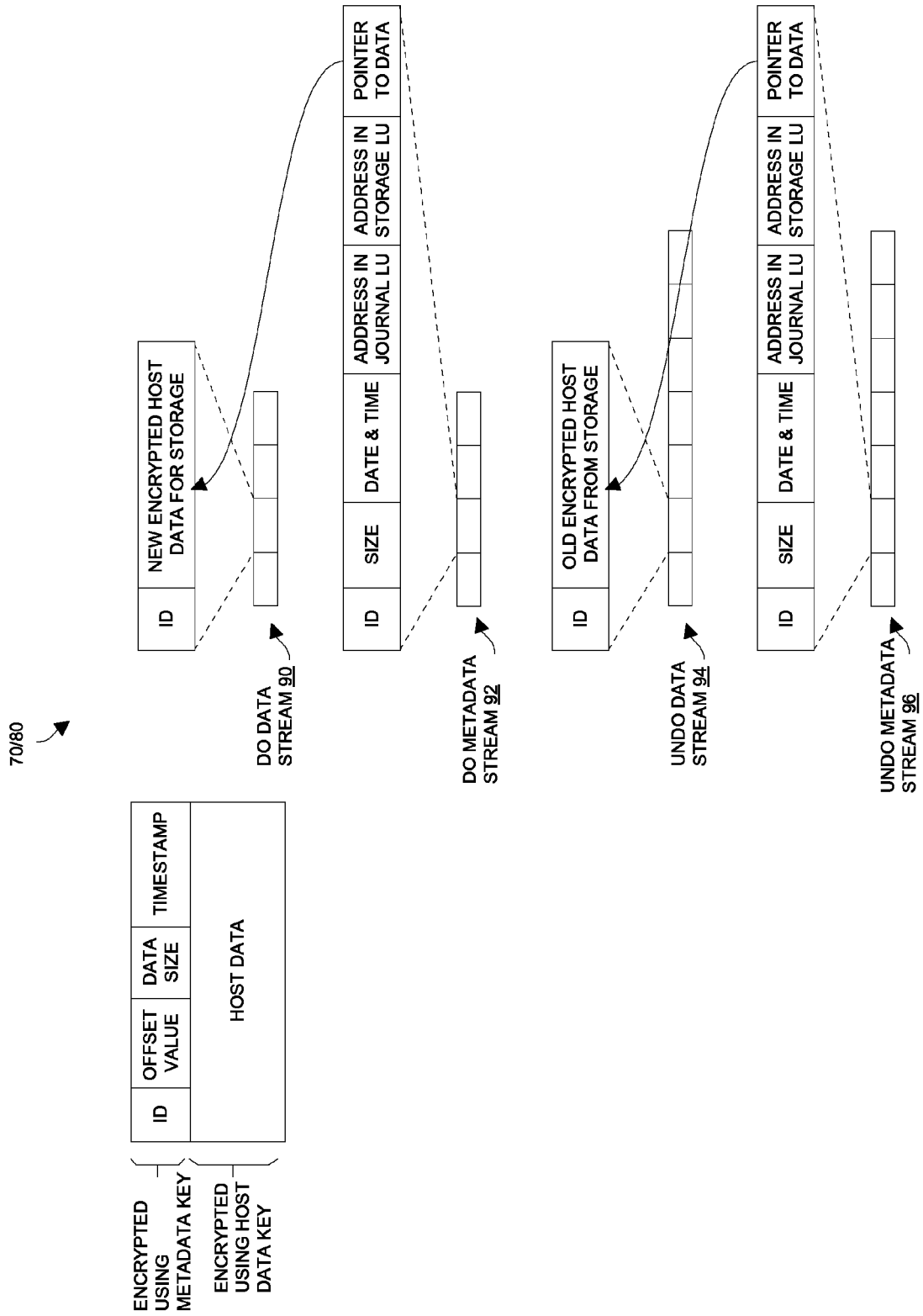
FIG. 2 is a block diagram of a journal log including a write transaction.

FIG. 2 shows a suitable format 80 for a block-based write transaction 70 which has been received by the replication appliance 32(B) (see left side of FIG. 2), and has been entered into the journal storage 34(B) (see right side of FIG. 2). The journal processor 50(B) may access the entered block-based write transactions 70 from the journal storage 34(B) to recover data of the LU 60(B) at any specified point in time. In particular, since the journal storage 34(B) contains the undo information necessary to roll back storage system 120, host data that was stored in specific memory locations at a specified point in time may be obtained by undoing block-based write transactions 70 that occurred after that time.

It should be understood that, although the metadata and the host data arrive within the block-based write transactions 70, the metadata and the host data were encrypted using different keys. In particular, the metadata was encrypted using a metadata key, and the replication appliance 32(B) has a copy of the metadata key to properly decrypt and process the metadata. However, the host data was encrypted using a host data key and the replication appliance 32(B) does not have a copy of the host data key thus preserving security of the host data.

Generally, the format 80 for the block-based write transaction 70 includes the following fields: a device (or volume) identifier; a time stamp, which is the date & time at which the transaction was received by source side replication appliance 32(A); a write size, which is the size of the data block; a location in the journal of the journal storage 34(B) where the host data is entered; a location in the LU 60(B) where the host data is to be written; and the host data itself.

The block-based write transaction 70 is transmitted from the source side replication appliance 32(A) to the destination side replication appliance 32(B). As shown in FIG. 2, the replication appliance 32(B) records the block-based write transaction 70 in the journal storage 34(B) via four streams. A first stream, referred to as a DO data stream (or simply DO stream) 90, includes new host data for writing in the LU 60(B). A second stream, referred to as an DO METADATA stream 92, includes metadata for the write transaction, such as an identifier, a date & time, a write size, a beginning address in the LU 60(B) for writing the new host data in, and a pointer to the offset in the DO stream 90 where the corresponding host data is located. Similarly, a third stream, referred to as an UNDO stream 94, includes old host data that was overwritten in the LU 60(B); and a fourth stream, referred to as an UNDO METADATA stream 96, includes an identifier, a date & time, a write size, a beginning address in the LU 60(B) where host data was written, and a pointer to the offset in the UNDO stream 94 where the corresponding old host data is located.

In practice each of the four streams 90, 92, 94, 96 holds a plurality of write transaction data. As block-based write transactions 70 are received dynamically by the destination side replication appliance 32(B), they are recorded at the end of the DO stream 90 and the end of the DO METADATA stream 92, prior to committing the transactions 70. During transaction application, when the various write transactions 70 are applied to the LU 60(B), prior to writing the new DO data into addresses within the data storage array 36(B) (also see FIG. 1), the older host data currently located in such addresses is recorded into the UNDO stream 94. In some examples, a metadata stream (e.g., UNDO METADATA stream 96 or the DO METADATA stream 92) and a host data stream (e.g., UNDO stream 94 or DO stream 90) may be kept in a single stream each (i.e., one UNDO data and UNDO METADATA stream and one DO data and DO METADATA stream) by interleaving the metadata into the data stream.

A description of similar journaling techniques is provide in U.S. Pat. No. 7,516,287, entitled "METHODS AND APPARATUS FOR OPTIMAL JOURNALING FOR CONTINUOUS DATA REPLICATION", the entire contents and teachings of which are hereby incorporated by reference.

It should be understood that the host data residing in the LU 60(B) as well as the journal storage 34(B) (see FIG. 2) remains encrypted and a copy of the host data key 74 is not present at the remote facility 22(B) (although a copy of the host data key 72 may be maintained at a separate location for safekeeping). Accordingly, privacy/security of the host data remains protected. As a result, if a third-party operates the remote facility 22(B), the third-party is unable to access the host data. In some arrangements, the metadata in the metadata streams 92, 96 remains encrypted by the metadata key 76 (e.g., when at rest and not in use) even though the metadata key 76 is available at the replica site.

Virtualization Arrangements

Figure 3:
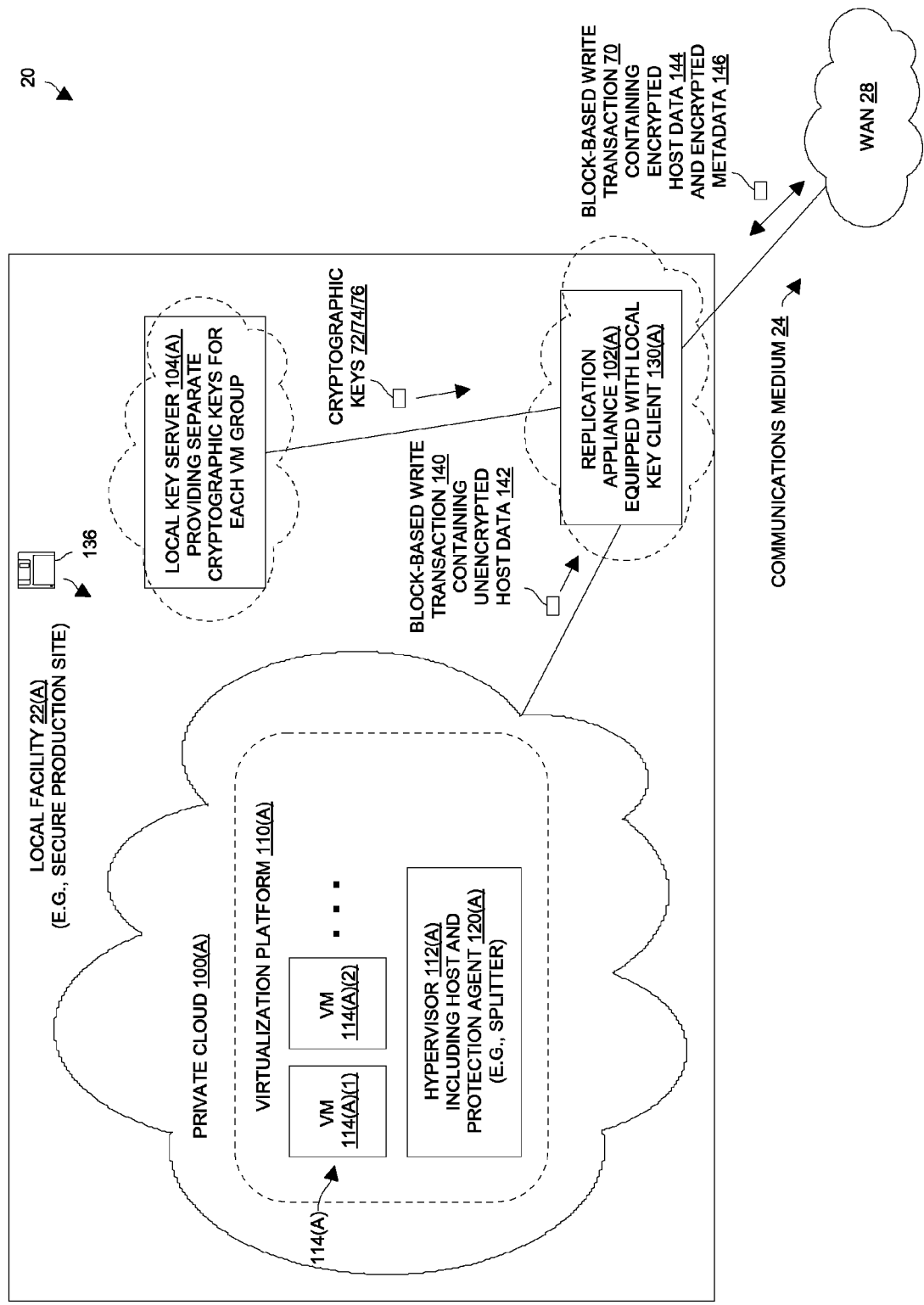
FIG. 3 is a block diagram illustrating particular details of a virtual private cloud configuration which is suitable for part of the electronic environment of FIG. 1.

FIG. 3 shows particular details of a local facility 22(A) which uses a private cloud configuration. In particular, the local facility 22(A) includes a virtual private cloud 100(A), a replication appliance 102(A), and a local key server 104(A) which communicate over a network. The virtual private cloud 100(A) includes a virtualization platform 110(A) to provide a virtualization environment, namely, a hypervisor 112(A) and a set of virtual machines 114(A)(1), 114(A)(2), ... (collectively, VMs 114(A)). The hypervisor 112(A) is equipped with a protection agent 120(A) (i.e., a splitter). The replication appliance 102(A) is equipped with a local key client 130(A).

In some arrangements, the replication appliance 102(A) and/or the local key server 104(A) are virtualized, i.e., run as virtual machines on a hypervisor. This detail is illustrated in FIG. 3 by the dashed clouds around the replication appliance 102(A) and the local key server 104(A).

Certain details of the local facility 22(A) are omitted from FIG. 3 for simplicity such as the underlying physical storage. However, it should be understood that a data storage array including storage processing circuitry and storage units exist within the local facility 22(A) to ultimately support operation of the virtualization environment (e.g., the virtualization platform 110(A) may be formed by one or more of the hardware components shown in FIG. 1).

In terms of actual physical hardware, the processing circuitry which provides all or parts of the local facility 22(A) is constructed and arranged to operate in accordance with the various software constructs stored in memory. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 136 is capable of delivering all or portions of the software to the memory. The computer program product 136 has a non-transitory (or non-volatile) computer readable medium which stores a set of instructions which controls one or more operations of the local facility 22(A). Examples of suitable computer readable storage media include tangible articles of manufacture and apparatus which store instructions in a non-volatile manner such as CD-ROM, flash memory, disk memory, tape memory, and the like.

The VMs 114(A) of the virtualization platform 110(A) are configured to run host applications to perform useful work. Such host applications may include enterprise-style applications such as database, SQL, email applications, and other transactional and/or customer applications that can operate at a block level. The hypervisor 112(A), perhaps in response to control parameters from a control VM 114(A), provides access to various virtualized resources including virtual storage devices backed by actual physical storage devices (see the data storage array 36(A) in FIG. 1). Recall that some of the actual storage hardware is purposefully omitted in FIG. 3 for simplicity. In some arrangements, the virtual storage devices and the hypervisor 112(A) share the same physical appliance.

The local key client 130(A) of the replication appliance 102(A) obtains a set of cryptographic keys 72 from the local key server 104(A). The set of cryptographic keys 72 includes a host data key 74 to encrypt host data 140, and a metadata key 76 to encrypt metadata associated with the host data.

During operation, suppose that at VM 114(A) issues an IO request to write host data 140. In response to the IO request, the protection agent 120(A) sends a block-based write instruction 140 (e.g., a SCSI write command) containing host data 142 to the replication appliance 102(A). It should be understood that the host data 142 is unencrypted since it is moving within the local facility 22(A), i.e., a trusted site.

Upon receipt of the block-based write instruction 140 containing the unencrypted host data 142, the replication appliance 102(A) encrypts the host data 142 using the host data key 74 to form encrypted host data 144, and encrypts metadata using the metadata key 76 to form encrypted metadata 146. The encrypted metadata 146 includes the host data transaction parameters such as the device ID, the offset, the size, and a current timestamp. The replication appliance 102(A) then packages the encrypted host data 144 and the encrypted metadata 146 into a block-based write transaction 70 and transmits the block-based write transaction 70 through the communications medium 24 to the remote facility 22(B) (also see FIG. 1).

The replication appliance 102(A) performs additional operations such as locally journaling the block-based write transaction 140 for possible local recovery, and sending an acknowledgement back to the protection agent 120(A). In turn, the protection agent 120(A) performs other operations such as, upon receipt of the acknowledgement from the replication appliance 102(A), sending a second block-based write instruction to local storage within the local facility 22(A) to locally store the host data 142. Further details of the operation outside the local facility 22(A) will now be provided with reference to FIGS. 4 and 5.

Figure 4:
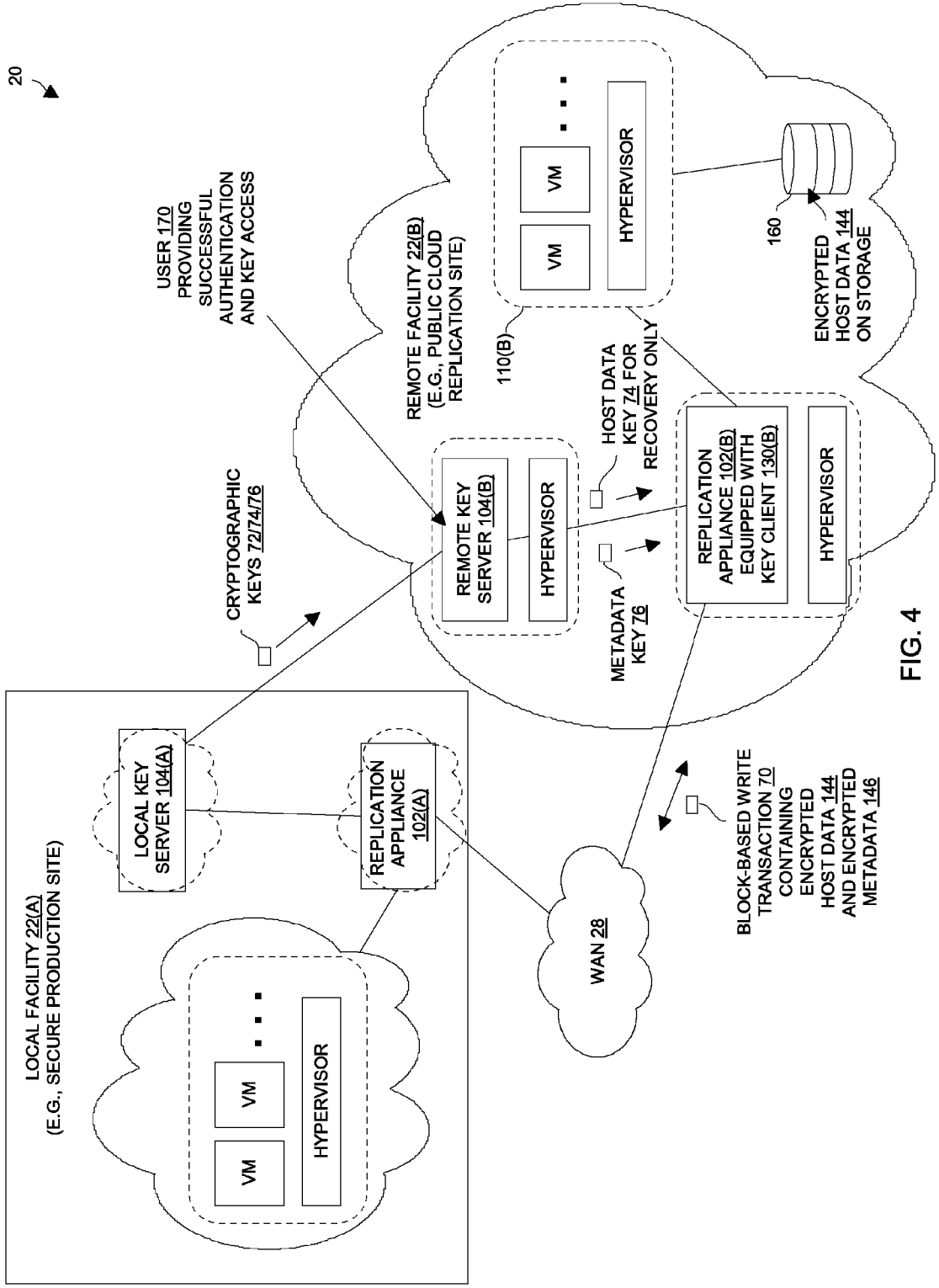
FIG. 4 is a block diagram illustrating activity between certain components of the electronic environment of FIG. 1 in accordance with a particular embodiment.
Figure 5:
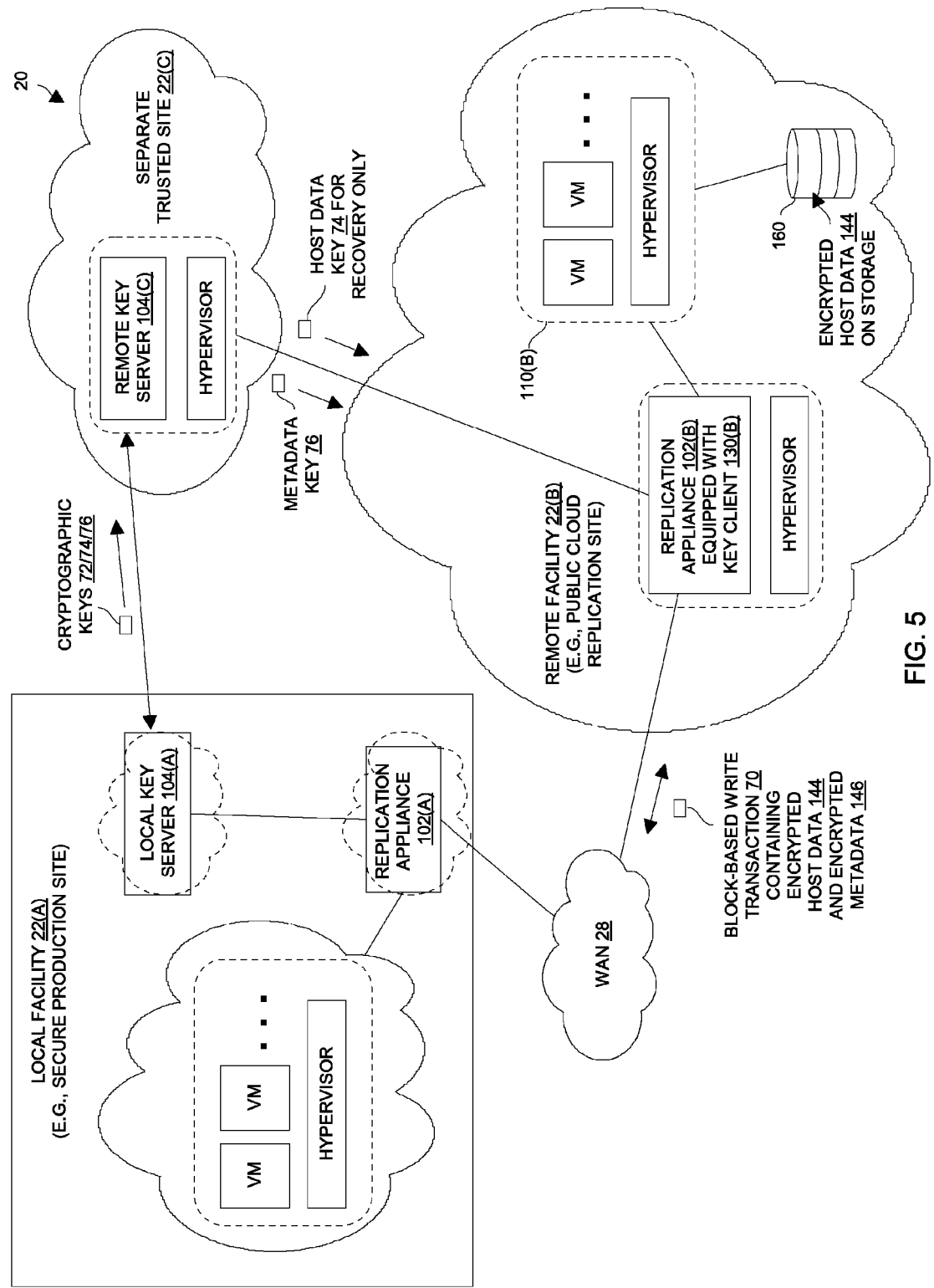
FIG. 5 is a block diagram illustrating activity between certain components of the electronic environment of FIG. 1 in accordance with another embodiment.

FIGS. 4 and 5 show different arrangements for storing and possibly recovering the host data in which all machines operating at the remote facility 22(B) have been virtualized (i.e., the replication application 102(B), the remote key server 104(B), etc. run as virtual machines on a hypervisor). FIG. 4 shows an arrangement in which the remote facility 22(B) provides access to recovered host data (i.e., the remote facility 22(B) is the recovery site) and the key manager containing all of the recovery keys resides at the remote facility 22(B). FIG. 5 shows an alternative arrangement in which the remote facility 22(B) does not normally hold the host data key 70, but either obtains the host data key 70 only to recover host data or sends the host data to another trusted site for recovery (e.g., back to the local facility 22(A) for operational recovery or to another trusted site 22(C) for trusted cloud recovery).

With reference to FIG. 4, the remote facility 22(B) may have a cloud configuration similar to that of the local facility 22(A) (FIG. 3). If the remote facility 22(B) does have such a cloud configuration, it should be understood that there is nevertheless physical hardware underlying the virtualization environment (e.g., also see the remote facility 22(B) in FIG. 1). In the context of a cloud configuration, the remote facility 22(B) is provisioned similarly to that of the local facility 22(A) except that the remote facility 22(B) may be operated by a different entity (e.g., a third-party cloud storage service). Accordingly, the remote facility 22(B) may not be at the same trust level and thus unsuitable for storage of certain types of host data.

As shown in FIG. 4, the remote facility 22 (B) includes a replication appliance 102(B) having a key client 130(B), a remote key server 104(B), and a virtualization platform 110 (B) which is provisioned with underlying physical storage 160 (also see the data storage array 36(B) in FIG. 1). The replication appliance 102(B) is capable of communicating with the replication appliance 102(A) of the local facility 22(A) through the communications medium 24 (e.g., via the WAN 28). Similarly, the remote key server 104(B) is capable of communicating with the local key server 104(A) of the local facility 22(A) through the communications medium 24 (e.g., out-of-band from the WAN 28 such as via TCP/IP communications).

At this point, it should be understood that deployment of the set of cryptographic keys 72 at the remote facility 22(B) may be controlled by a user 170 (e.g., an administrator who successfully authenticates with the remote facility 22(B)). Along these lines, the remote key server 104(B), under control of the user 170, obtains a copy of the metadata key 76 from the local key server 104(A), e.g., via an external and remote key manager 180, and provides the copy of the metadata key 76 to the key client 130(B) of the replication appliance 102(B) for use in decrypting the encrypted metadata 146, and journaling and storing the encrypted host data 144 within the remote facility 22(B) (see the physical storage 160 in FIG. 4).

The remote key manager 180 may allocate just a small amount of memory to store the set of keys 72, i.e., there is no requirement for a huge cloud at the remote key manager 180. Furthermore, the remote key manager 180 may be controlled by a trusted third party, e.g., a third-party trusted key service that manages keys on behalf of multiple customers. Such key management solutions may be offered by the RSA Security division of EMC Corporation.

When the replication appliance 102(B) receives the block-based write transaction 70 from the local facility 22(A) through the communications medium 24, the replication appliance 102(B) decrypts the encrypted metadata 146 using the metadata key 76, but leaves the host data 144 in encrypted form. After decrypting the metadata 146, the replication appliance 102(B) stores the encrypted host data 144 based on the device ID, the offset, the size, and a current timestamp (also see FIG. 2), and acknowledges completion of the block-based write transaction 70 back to the local facility 22(A). Accordingly, the host data 144 stored within the remote facility 22(B) is not an identical copy of the host data 142 stored within the local facility 22(A). Rather, the host data 144 stored within the remote facility 22(B) is encrypted, while the host data 142 stored within the local facility 22(A) is not encrypted.

Additionally, the replication appliance 102(B) performs journaling operates as well in order to enable roll-back to earlier points in time. In some arrangements, the replication appliance 102(B) re-encrypts some or all of the metadata 146 for extra security.

If the local facility 22(A) requests any of the encrypted host data 144, the replication appliance 102(B) is able to retrieve that encrypted host data 144 from the storage 160 and send the encrypted host data 144 back to the local facility 22(A). Recall that the local facility 22(A) has the set of cryptographic keys 72 thus enabling the local facility 22(A) to then decrypt the encrypted host data 144 to recover the unencrypted host data 142. Thus, the replication appliance 102(B) journals and processes encrypted host data 144 rather than unencrypted host data 142 which is journaled and processed by the replication appliance 102(A).

It should be understood that the production site operation is capable of failing over to the remote facility 22(B) during certain circumstances. During failover (and perhaps other situations such as operational recovery at the remote facility 22(B)), the remote key server 104(B), under control of the user 170, is capable of obtaining a copy of the host data key 74 from the local key server 104(A) and providing the copy of the host data key 74 to the key client 130(B) of the replication appliance 102(B) for use in decrypting the encrypted host data 144 from the storage 160 in order to access the unencrypted host data 142 from the remote facility 22(B). The VMs of the virtualization platform 110(B) then operate to deliver access to the unencrypted host data 142 in the same manner as that of the virtualization platform 110(A) (e.g., by running host applications, etc.).

In some arrangements, the user 170 is required to periodically re-authenticate with the remote facility 22(B) (e.g., routinely provide a new password, a new one-time use passcode, etc.) over the course of a recovery session in order to sustain operation of the remote facility 22(B) as a data recovery site since the remote facility 22(B) is less trusted than the local facility 22(A). In these arrangements, the user 170 is able to provide a user command which imposes the re-authentication time period, i.e., a maximum amount of time that is allowed to elapse before the user re-authenticates.

In some arrangements, the user 170 is able to issue a lockout command to the remote facility 22(B) to immediately delete one or more of the keys 72, 74, 76 from the remote facility 22(B) and thus prevent subsequent host data access. Additionally, the remote facility 22(B) can be configured to automatically delete the host data key 76 when either user authentication fails or access to the user 170 is stopped.

With reference to FIG. 5, the remote facility 22(B) is configured in a manner similar to that of FIG. 4. However, a remote key server 104(C) resides in a separate trusted site 22(C).

During normal operation, the remote key server 104(C) may provision the remote facility 22(B) with the metadata key 76 to enable the replication appliance 102(B) to properly access the metadata from the local facility 22(A) if the metadata is encrypted. However, the remote key server 104(C) does not provide the remote facility 22(B) with the host data key 74 thus maintaining privacy of the encrypted host data 144 at the remote facility 22(B).

To perform recovery using the encrypted host data 144, the remote facility 22(B) may send the encrypted host data 144 back to the local facility 22(A) if the local facility 22(A) is operational. Alternatively, the remote facility 22(B) may send the encrypted host data 144 to a new production site, and the remote key server 104(C) may send the keys to the new production site for recovery at that the new production site. As yet another alternative, the remote key server 104(C) may send the host data key 74 to the remote facility 22(B) to perform recovery at the remote facility 22(B).

Further Details

Figure 6:
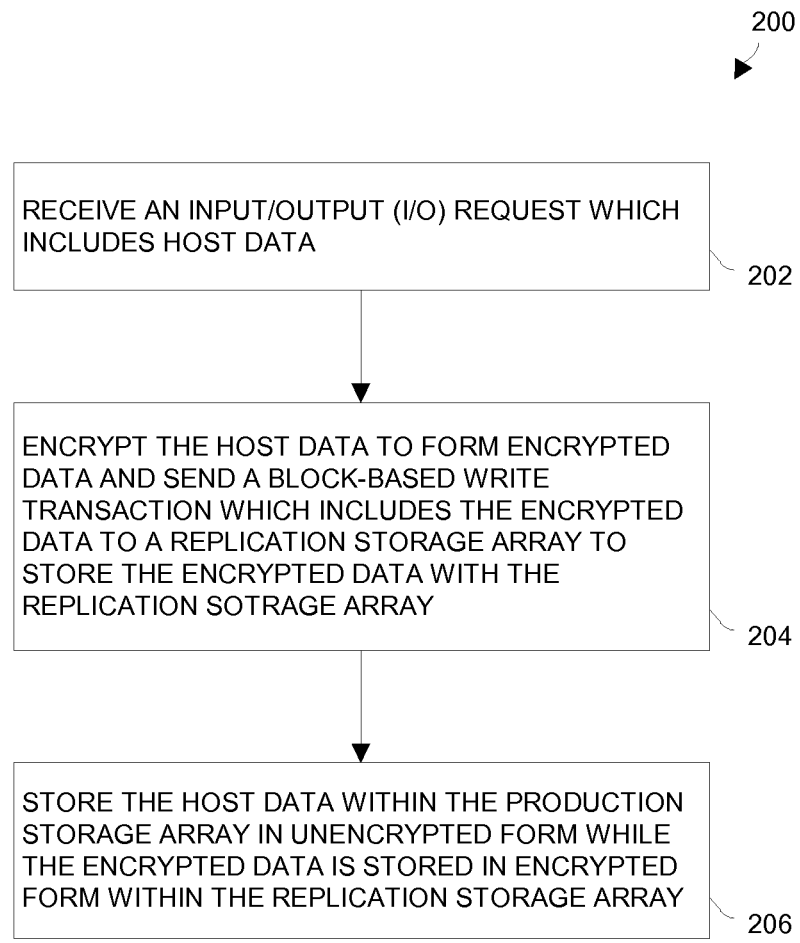
FIG. 6 is a flowchart of a procedure which is performed by the electronic environment of FIG. 1 when securing host data in cloud storage.

FIG. 6 shows a flowchart of a procedure 200 which is performed by processing circuitry of the electronic environment 20. It should be understood that, in the cloud context, the circuitry may be distributed among multiple computerized devices or disposed in a single location.

In step 202, the circuitry of the electronic environment 20 receives an (I/O) request which includes unencrypted host data. For example, in private cloud configuration, VMs 114(A) running host applications may provide SCSI commands to the protection agent 120(A) and the replication appliance 102(A) for processing (also see FIG. 3).

In step 204, the circuitry of the electronic environment 20 encrypts the host data to form encrypted data and sends a block-based write transaction which includes the encrypted data to a replication storage array to store the encrypted data within the replication storage array (see the remote facilities 22(B) in FIGS. 1, 4 and 5). The replication storage array may be operated by a third-party cloud storage service (also see FIGS. 4 and 5).

In step 206, the circuitry of the electronic environment 20 stores the host data within the production storage array (see the local facilities 22(A) in FIGS. 1, 4 and 5). Accordingly, the unencrypted host data is stored at the production storage array and the encrypted data is stored within the replication storage array thus securing the host data.

Figure 7:
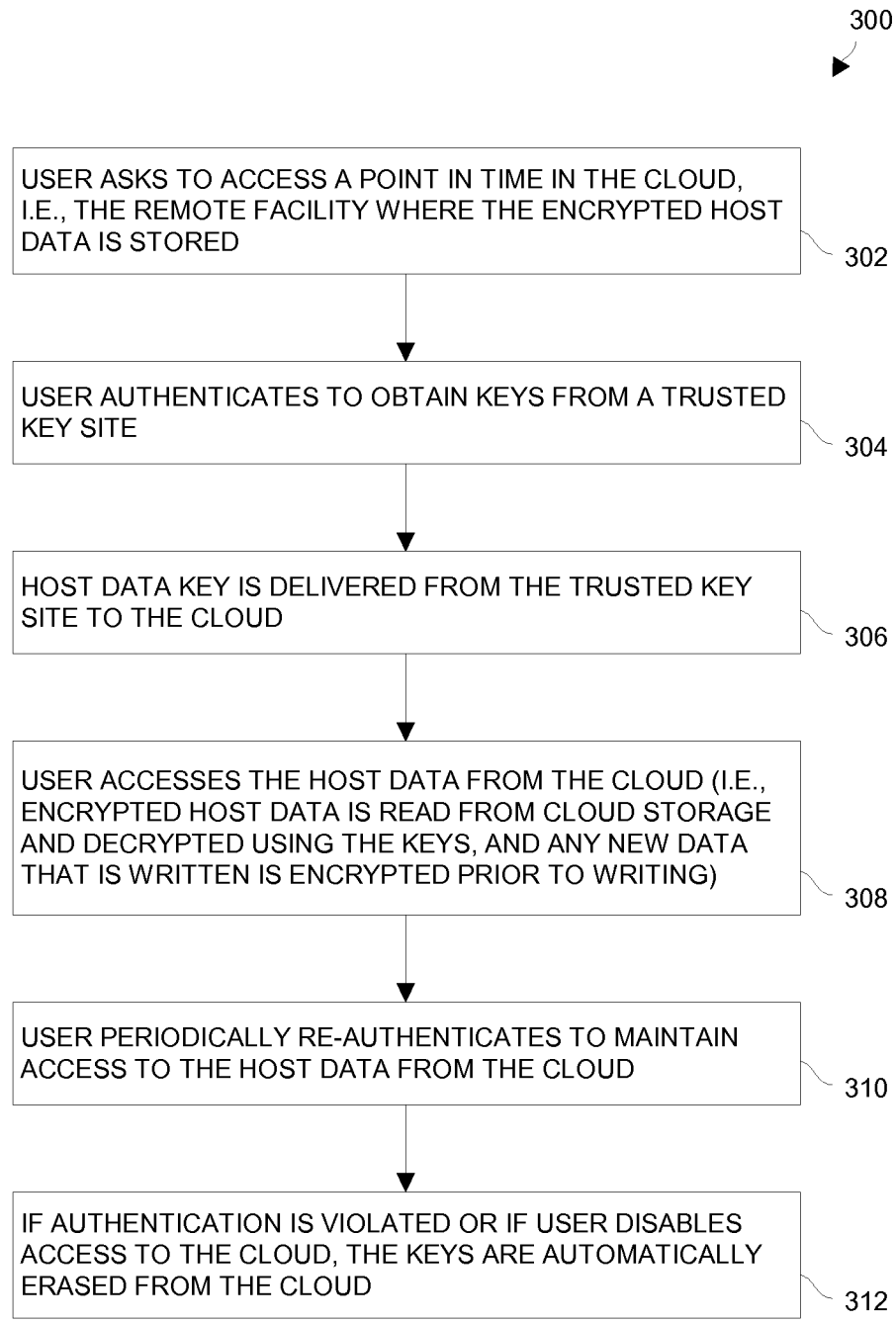
FIG. 7 is a flowchart of a procedure which is performed by the electronic environment to recover host data to a point in time from the cloud.

FIG. 7 shows a procedure 300 which is performed to access host data from cloud storage (also see FIG. 4). In step 302, the user asks to access a point in time in the cloud. Such operation may involve the user 170 logging into the remote facility 22(B) and identifying a particular point in time for the host data (e.g., the current or most recent version, a prior version, etc.).

In step 304, the user authenticates in order to obtain the host data key 74 from the remote key manager 180 (FIG. 4). Such authentication may involve standard single or multi-factor authentication, adaptive authentication, and so on.

In step 306, the remote key manager 180 delivers the host data key 74 to the remote facility 22(B) in response to successful authentication. At this point, the remote facility 22(B) is able to decrypt the encrypted host data from cloud storage.

In step 308, the user accesses the host data from the cloud storage. That is, the appropriate host data is read and decrypted. To roll-back to a prior point in time, the replication appliance 102(B) accesses journaled data (also see the streams 90-96 in FIG. 2). Any new host data to be written to the cloud storage is first encrypted using the host data key 74.

As illustrated by step 310, the user is required to periodically re-authenticate to maintain access to the host data from the cloud. Such re-authentication may require the user to periodically enter a passcode or other authentication factor.

As illustrated by step 312, if the user does not successfully authenticate or if the user purposefully turns off access (e.g., logs off or directs access to stop), the host data key 74 is automatically deleted from the cloud to prevent further access to the host data.

Figure 8:
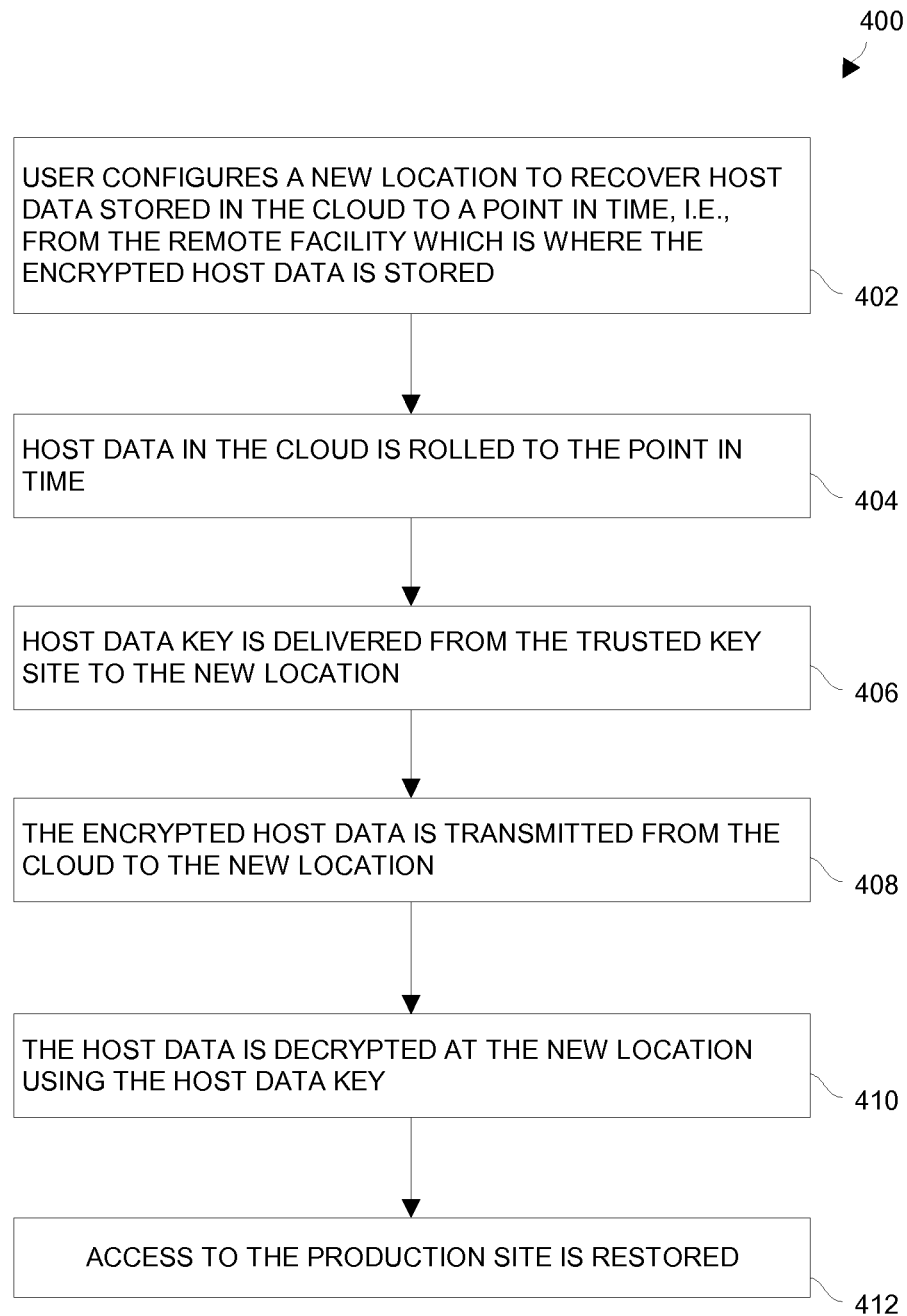
FIG. 8 is a flowchart of a procedure which is performed by the electronic environment to recover host data to a point in time from the cloud to a new location.

FIG. 8 shows a procedure 400 which is performed to access host data at a new location, i.e., a new production site. In step 402, the user configures the new location to recover host data stored in the cloud to a particular point in time (e.g., the current or most recent version, a prior version, etc.). Along these lines, the user confirms that enough storage is available at the new location to properly recover the host data.

In step 404, remote facility 22(B) rolls back the host data to the point in time specified by the user. That is, the replication appliance 102(B) accesses journaled data (also see the streams 90-96 in FIG. 2) and applies data from the journal to the replica volume so that the replica volume holds the encrypted data at the required point in time.

In step 406, the remote key manager 180 delivers the host data key 74 to the new location under direction of the user. At this point, the new location is able to decrypt the encrypted host data from cloud storage.

In step 408, the encrypted host data is read from the remote facility 22(B) to the new location.

In step 410, the host data is decrypted at the new location using the host data key 74.

In step 412, access to the production facility 22(A) is restored.

As described above, improved techniques are directed to encrypting host data before it leaves trusted systems to untrusted systems. Along these lines, a company which employs a third-party cloud storage service may encrypt the host data and send, in the form of block-based write transactions, only encrypted data to the third-party cloud storage service. Accordingly, only encrypted data leaves the company premises. Thus, the host data cannot be read by the third-party cloud storage service. Additionally, the company does not need to rely on the third-party cloud storage service for access control (i.e., the company can decide who holds the cryptographic keys). Furthermore, the company can avoid compliance issues (e.g., personal information is not disclosed, there are no disclosures made which pose national security issues, etc.).

While various embodiments of the present disclosure have been particularly shown and described, it will be understood by those skilled in the art that various changes in form and details may be made therein without departing from the spirit and scope of the present disclosure as defined by the appended claims.

For example, it should be understood that the cryptographic keys 72, 74, 76 were described above in the general sense (i.e., with the ability to encrypt as well as decrypt). In some arrangements, separate encryption and decryption keys are utilized for additional security. In these arrangements, the host data key is provided to the production side equipment. A different host data decryption key is provided only "as needed" such as during recovery. Such management can be controlled by a key management server operated by an entity that is separate from a third-party cloud storage service that operates the remote facility 22(B).

Additionally, in some arrangements, one or more of the cryptographic keys 72, 74, 76 are periodically rotated or changed this preventing full host data recovery without all of the keys. Again, such operation may be under the direction of a key management server.

Furthermore, it should be understood that the replication appliances 102(A), 102(B) were shown as being separate and outside the virtualization platforms by way of example only. In some arrangements, the replication appliances 102(A), 102(B) run as VMs (e.g., dedicated VMs). Such modifications and enhancements are intended to belong to various embodiments of the disclosure.

What is claimed is:

1. A method of securing data in cloud storage, the method comprising:
   receiving, by processing circuitry, a replicated input/output (I/O) request which includes host data from a local host computer;
   encrypting, by the processing circuitry, the host data to form encrypted data and sending a block-based write transaction which includes the encrypted data to a remote replication storage array to store the encrypted data within the remote replication storage array; and
   storing, by the processing circuitry in response to an original input/output (I/O) request which includes the host data, the host data in unencrypted form within a local production storage array, the encrypted data being stored within the remote replication storage array to secure the unencrypted host data which is stored at the local production storage array;
   wherein the processing circuitry is (i) local to a production logical unit (LU) of the production storage array and (ii) remote from a replication LU of the replication storage array;
   wherein storing the host data within the production storage array includes writing unencrypted host data from the processing circuitry to the production LU of the production storage array;
   wherein encrypting the host data includes generating, by the processing circuitry, encrypted host data which is different from the unencrypted host data written to the production LU of the production storage array; and
   wherein sending the block-based write transaction includes writing the encrypted host data to the replication LU of the replication storage array to simultaneously maintain (i) the encrypted host data at the replication LU of the replication storage array and (ii) the unencrypted host data at the production LU of the production storage array.

2. A method as in claim 1 wherein the processing circuitry uses a host data key to form the encrypted data from the host data; and wherein the method further comprises:
   maintaining the host data key within a key manager local to the production storage array.

3. A method as in claim 2, further comprising:
   maintaining a copy of the host data key within a remote key manager which is remote relative to the production storage array.

4. A method as in claim 3 wherein maintaining the copy of the host data key within the remote key manager includes:
   disposing the remote key manager in a public cloud.

5. A method as in claim 1, further comprising:
   receiving the encrypted data at the production storage array from the replication storage array, and decrypting the encrypted data at the production storage array to recover the host data in unencrypted form.

6. A method as in claim 1, further comprising:
receiving the encrypted data at a new trusted site which is separate from the replication storage array, and decrypting the encrypted data at the new trusted site to recover the host data in unencrypted form.

7. A method as in claim 1, further comprising:
receiving a copy of a host data key at the replication storage array, and decrypting the encrypted data at the replication storage array using the copy of the host data key to recover the host data in unencrypted form.

8. A method as in claim 7 wherein receiving the copy of the host data key at the replication storage array includes:
obtaining the copy of the host data key from a key manager local to the production storage array.

9. A method as in claim 7 wherein receiving the copy of the host data key at the replication storage array includes:
obtaining the copy of the host data key from a trusted key manager which is remote relative to the production storage array.

10. A method as in claim 7, further comprising:
successfully authenticating a user, the copy of the host data key being received at the replication storage array in response to successful authentication of the user.

11. A method as in claim 7, further comprising:
successfully re-authenticating a user, decryption of the encrypted data at the replication storage array using the copy of the host data key occurring in response to successful re-authentication of the user.

12. A method as in claim 11, further comprising:
automatically deleting the copy of the host data key from the replication storage array in response to unsuccessful authentication of the user.

13. A method as in claim 11, further comprising:
automatically deleting the copy of the host data key from the replication storage array in response to stopped access from the user.

14. A method as in claim 11, further comprising:
receiving a user command which imposes a re-authentication time period on the user, the re-authentication time period indicating a maximum amount of time that is allowed to elapse before the user re-authenticates.

15. A method as in claim 11, further comprising:
receiving a lockout command from the user, and
deleting the copy of the host data key from the replication storage array in response to the lockout command.

16. A method as in claim 1, further comprising:
encrypting metadata of the I/O request to form encrypted metadata, the encrypted metadata being included within the block-based write transaction which is sent to the replication storage array; and
storing the metadata in a journal log within the production storage array.

17. A method as in claim 16 wherein the processing circuitry uses a metadata key to form the encrypted metadata from the metadata, the metadata key being different than the host data key; and wherein the method further comprises:
maintaining a secure copy of the metadata key in the replication storage array.

18. A method as in claim 1, further comprising:
replacing a host data key used by the processing circuitry to encrypt the host data with another host data key to rapidly shift keys which are used to secure host data provided by the local host computer.

19. A computer program product having a non-transitory computer readable medium which stores a set of instructions to secure data in cloud storage, the set of instructions, when carried out by computerized circuitry, causing the computerized circuitry to perform a method of:
receiving a replicated input/output (I/O) request which includes host data from a local host computer;
encrypting the host data to form encrypted data and sending a block-based transaction which includes the encrypted data to a remote replication storage array to store the encrypted data within the remote replication storage array; and
storing, in response to an original input/output (I/O) request which includes the host data, the host data in unencrypted form within a local production storage array, the encrypted data being stored within the remote replication storage array to secure the unencrypted host data which is stored at the local production storage array;
wherein the computerized circuitry is (i) local to a production logical unit (LU) of the production storage array and (ii) remote from a replication LU of the replication storage array;
wherein storing the host data within the production storage array includes writing unencrypted host data from the computerized circuitry to the production LU of the production storage array;
wherein encrypting the host data includes generating, by the computerized circuitry, encrypted host data which is different from the unencrypted host data written to the production LU of the production storage array;
wherein sending the block-based write transaction includes writing the encrypted host data to the replication LU of the replication storage array to simultaneously maintain (i) the encrypted host data at the replication LU of the replication storage array and (ii) the unencrypted host data at the production LU of the production storage array.

20. Electronic circuitry, comprising:
memory; and
processing circuitry coupled to the memory, the memory storing instructions which, when carried out by the processing circuitry, cause the processing circuitry to:
receive a replicated input/output (I/O) request which includes host data from a local host computer,
encrypt the host data to form encrypted data and send a block-based transaction which includes the encrypted data to a remote replication storage array to store the encrypted data within the remote replication storage array, and
store, in response to an original input/output (I/O) request which includes the host data, the host data in unencrypted form within the local production storage array, the encrypted data being stored within the remote replication storage array to secure the unencrypted host data which is stored at the local production storage array;
wherein the processing circuitry is (i) local to a production logical unit (LU) of the production storage array and (ii) remote from a replication LU of the replication storage array;
wherein the host data is stored within the production storage array by, at least in part, writing unencrypted host data from the processing circuitry to the production LU of the production storage array;
wherein the host data is encrypted, at least in part, by generating, by the processing circuitry, encrypted host data which is different from the unencrypted host data written to the production LU of the production storage array;

wherein the block-based write transaction is sent, at least in part, by writing the encrypted host data to the replication LU of the replication storage array to simultaneously maintain (i) the encrypted host data at the replication LU of the replication storage array and (ii) the unencrypted host data at the production LU of the production storage array.

21. The method of claim 1, further comprising:

wherein the input/output (I/O) request received by the processing circuitry comprises a write command issued by the local host computer, wherein the local host computer is located in a local facility, and wherein the local production storage array is also located in the local facility;

wherein the write command issued by the local host computer in the local facility is intended for a logical unit within the production storage array;

wherein the storing of the host data within the production storage array is performed in response to the write command issued by the host computer in the local facility, and includes storing the host data, without encryption, into the intended logical unit within the production storage array; and wherein the storing of the host data, without encryption, into the intended logical unit within the production storage array is performed in response to receiving an acknowledgement that the encrypted data has been stored within a logical unit in the replication storage array, and such that none of the host data is allowed to leave the local facility without being encrypted.

22. The method of claim 17, further comprising:

wherein the metadata within the block-based write transaction includes an address of a location within a logical unit in the replication storage array;

receiving the block-based write transaction at the replication storage array;

using the metadata key to decrypt the metadata in the block-based write transaction; and storing the encrypted data from the block-based write transaction into the logical unit in the replication storage array, beginning at the location indicated by the address included the metadata within the block-based write transaction.

* * * * *